T. J. P. AANSTOOTS.
PRESSURE REGULATING AIR CIRCULATING SYSTEM FOR SUBMARINES.
APPLICATION FILED FEB. 27, 1914.
1,115,367. Patented Oct. 27, 1914.
3 SHEETS—SHEET 1.
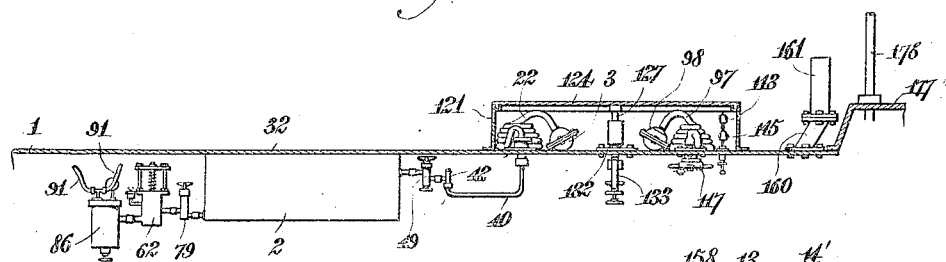
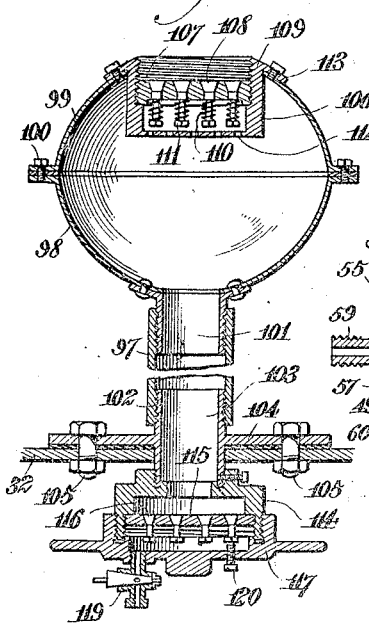
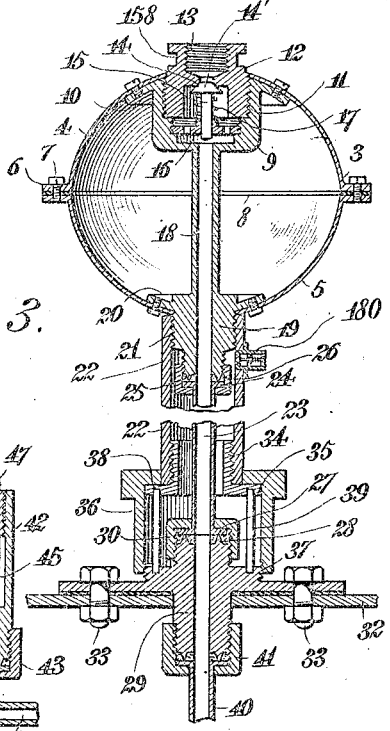
Witnesses:
Christ Feinle, Jr.
P. M. Smith
Inventor,
T. J. P. Aanstoots.
By Victor J. Evans,
Attorney.

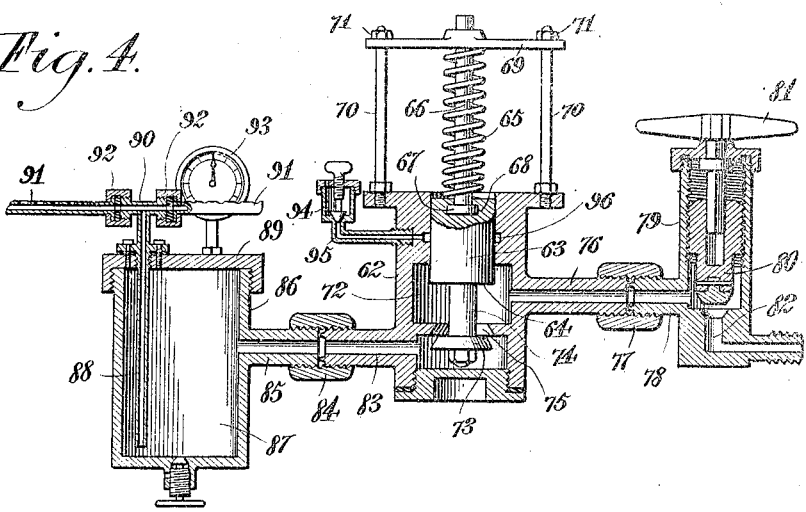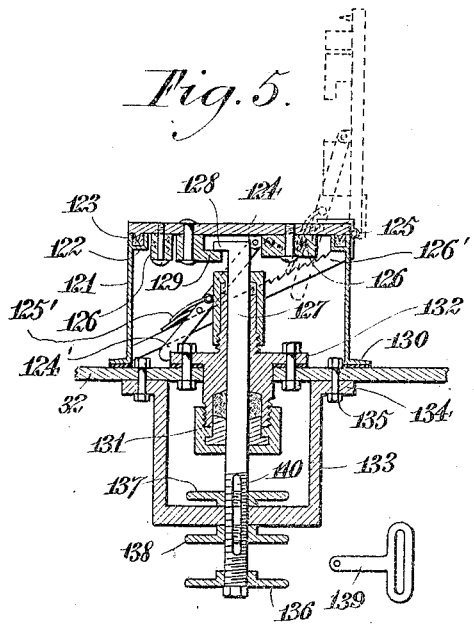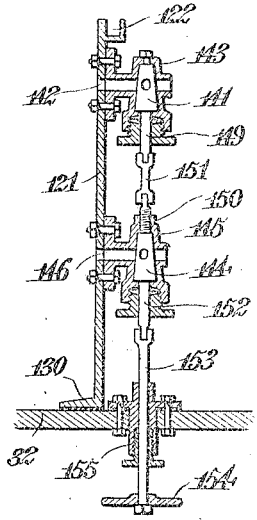

T. J. P. AANSTOOTS.
PRESSURE REGULATING AIR CIRCULATING SYSTEM FOR SUBMARINES.
APPLICATION FILED FEB. 27, 1914.
1,115,367.
Patented Oct. 27, 1914.
3 SHEETS—SHEET 3.
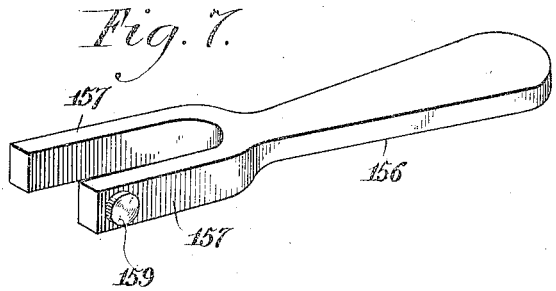
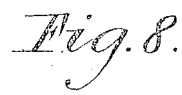
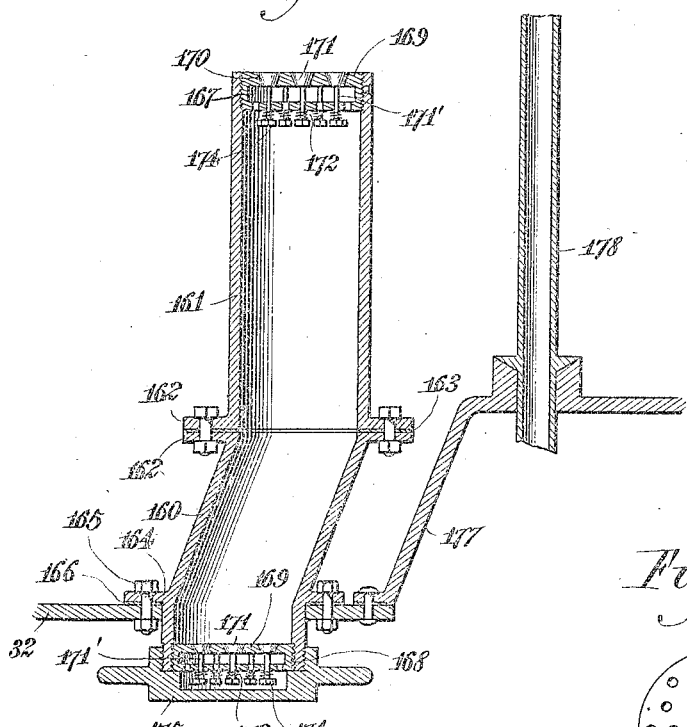
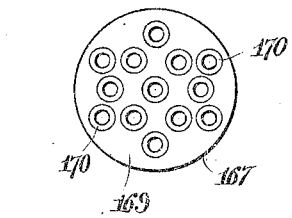
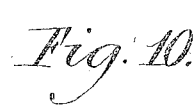
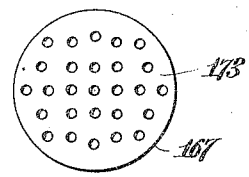
Inventor,
T. J. P. Aanstoots,
By Victor J. Evans,
Attorney.
Witnesses:
Christ Peinle, Jr.
R. M. Smith

UNITED STATES PATENT OFFICE.

THEODORUS J. P. AANSTOOTS, OF PASSAIC, NEW JERSEY.

PRESSURE-REGULATING AIR-CIRCULATING SYSTEM FOR SUBMARINES.

1,115,367.  Specification of Letters Patent.  Patented Oct. 27, 1914.

Application filed February 27, 1914. Serial No. 821,561.

*To all whom it may concern:*

Be it known that I, THEODORUS J. P. AANSTOOTS, a subject of the Queen of the Netherlands, residing at Passaic, in the county of Passaic and State of New Jersey, have invented new and useful Improvements in Pressure-Regulating Air-Circulating Systems for Submarines, of which the following is a specification.

This invention relates to a pressure regulating air circulating system for submarines, the object of the invention being broadly to provide apparatus which will be largely instrumental in the saving of human lives and also the submarine boat equipped therewith, in case the boat should be unable to rise to the surface of the water, enabling the boat and crew to remain submerged for a week or more, until the necessary assistance can be obtained for raising the boat and crew to the surface of the water.

The invention has among its objects to provide means for exhausting the vitiated air from the interior of the submarine boat, the exhaust of such air taking place automatically, the exhaust pipe, however, being under the control of the occupants of the boat, who may trap the air therein so as to prevent the wasteful use of the same.

The invention also embodies means for permitting the escape of air from the outlet pipe, while preventing the admission of water thereto, and means for testing the outlet pipe to detect the presence of water therein, occasioned either by a leak or break in the pipe.

A further object of the invention is to provide means for detecting the presence of water in the inlet pipe preparatory to opening the same up into communication with the storage tank; means for regulating the pressure of air in the boat, so as to insure a discharge of the vitiated air therefrom; means for distributing the air from the compressed air tank to various parts of the boat; and means for holding and releasing the inlet and outlet pipes, controllable from the interior of the boat.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a partial vertical longitudinal section through a submarine boat, showing the apparatus in side elevation. Fig. 2 is a vertical section of the valved outlet pipe on an enlarged scale. Fig. 3 is a similar view of the valved inlet pipe. Fig. 4 is a vertical section through part of the boat, showing the testing, pressure regulating and air distributing apparatus, storage tank and corelated parts. Figure 5 is a vertical section through the storage box, showing also the under deck bolt guide and related parts. Fig. 6 is a detail vertical section showing the testing mechanism for the storage box. Fig. 7 is a detail perspective view of the wrench used at the receiving end of the inlet pipe. Fig. 8 is a detail vertical section on an enlarged scale through the fixed and rigid air outlet pipe and the periscope tube, also portions of the deck and dome. Figs. 9 and 10 are respectively top and bottom plan views of the valve cages.

Referring to the drawings, 1 designates a submarine boat structure, in which is mounted a compressed air tank 2, to which the air inlet pipe, hereinafter particularly described, it attached in such manner that the supply of air may be pumped from a vessel on the surface of the water containing a suitable air compressor into said tank in the submarine boat.

The inlet pipe comprises a hollow buoyant head 3, shown as comprising two substantially hemi-spherical sections 4 and 5 having flanges 6 bolted together, as shown at 7, with a packing ring or gasket 8 interposed between the flanges to secure a water and air-tight joint.

In the upper portion or section of the buoyant head 3 is a valve cage 9 provided with a flange 10 fastened to the section 4 of the head. This cage 9 is internally threaded, as shown at 11, to receive a hollow nipple 12, the outer end of which is internally threaded, as at 13, to enable the nozzle of the hose from a suitable air compressor to be coupled thereto at the surface of the water. The nipple 12 is provided with an internal valve seat 14, with which an inwardly opening air valve 14' contacts, the stem 15 of said valve working through a central opening in a perforated guide plate 16 contained in the lower portion of the cage 9, and the valve being normally held against its seat by means of a spring 17 coiled around the stem 15 and interposed between the valve body and the guide 16.

Extending inwardly from the valve cage 9 is a metal tube 18 which is enlarged at its inner end, as shown at 19, and provided with a flange 20, by which it is bolted or otherwise secured to the inner section 5 of the buoyant head. The part 19 is also exteriorly threaded, as at 21, to admit of the secure attachment thereto of a rubber hose or casing 22 of suitable length to reach downwardly to the submarine boat. Within the flexible hose 22 is arranged a soft metal tube 23 of less diameter, said tube being preferably formed of copper and having at its upper end a flange 24 which is engaged by a circular rib 25 on the part 19, said rib being V-shaped in cross section, so that when the tube 23 is connected to the tube 18 by means of a threaded coupling 26, said rib will be embedded in the flange 24 forming a water and air-tight joint. At its lower end the tube 23 is provided with a similar flange 27 which is engaged by an annular rib 28 on a deck fitting 29, the upper end of said fitting being exteriorly threaded to receive an internally threaded coupling 30 similar to and having the same function as the coupling 26, above referred to.

The deck fitting 29 is provided with a flange or deck plate fastened by bolts 33 to the deck 32 of a submarine boat. The lower end of the hose 22 is securely fastened to a threaded nipple 34, the flange 35 of which is engaged by a relatively large union 36, said union having a threaded engagement, at 37, with the deck fitting. The flange 35 and the deck fitting 29 are provided with annular grooves 38 to receive semi-cylindrical spacers 39, as shown in Fig. 3, which spacers serve to compensate for the variation in the length of the inner metallic tube 23 and the outer rubber hose or casing 22.

On the inner end of the deck fitting 29 within the hull of the submarine boat, an air tube 40 forming an extension of the flexible inlet pipe is connected by means of a coupling 41. The other end of the pipe 40 is connected to one end of a check valve casing 42 by means of a threaded coupling 43, each of the joints within the couplings 41 and 43 being similar to those contained in the couplings 26 and 30, hereinabove described, so as to form a tight joint at each place. Within the casing 42 is mounted a check valve 44 held against its seat by means of a coiled spring 45 encircling the stem 46 of the valve.

47 designates a combined plug and guide for the valve stem 46, the same being screwed into one end of the casing 42, as shown in Fig. 3.

Arranged at one side of the check valve and connected thereto by means of a union 48 is a casing 49, in one end of which is arranged a stop cock 50, while in the other end of said casing is arranged a test cock 51. The stop cock 50 is provided with a square axial recess 52 which receives the square stem 53 of an operating handle 54, the stem 53 passing through a cap 55 threaded on the casing 49 and being provided inside of the cap with an annular shoulder or flange 56 which, when the stem 53 is moved outwardly, lies in close contact with the inner wall of the cap 55 and prevents leakage of air. The stop cock 50 is internally threaded, as shown, and engages internal threads within the casing 49, so that by turning the handle 54, the stop cock is advanced toward or moved away from its seat 57, for opening up or closing the air passage 58. 59 designates the nozzle which is connected to the compressed air tank, as shown. The test cock 51 is also threaded into the casing 49, as shown, being thereby movable toward and away from its seat 60.

61 designates a part, through which any water found in the passage 58 may drip, thus indicating the presence of a leak or break in the inlet pipe as a whole.

The air on leaving the compressed air tank is admitted to the casing 62 of a pressure regulator which embodies a plunger 63 having a face 64, against which the compressed air acts. The plunger 63 is normally pressed inwardly by means of a coiled spring 65, encircling a stem 66 extending outwardly from the plunger and provided at its inner end with a head or flange 67 adapted to turn in a recess 68 in the outer end of the plunger. The stem 66 passes through a combined guide and follower 69, the ends of which fit over parallel bolts 70 extending outwardly from the casing 62, said bolts being threaded to receive nuts 71, by means of which the member 69 may be adjusted inwardly or outwardly to increase or diminish the tension of the spring 65, thereby regulating the resistance of the plunger 63 to the air contained within the pressure chamber 72 of the regulator.

Arranged opposite the face 64 of the plunger is a valve 73 carried by the stem 74 of the plunger, the stem 74 projecting from the side of the plunger opposite the stem 66. As the plunger 63 moves with the casing, the valve 73 is moved toward and away from the valve seat 75.

Extending off from one side of the chamber 72 is a pipe 76 which is connected by a union 77 to the nozzle 78 of a casing 79, in which is arranged a stop cock 80 provided with an operating handle 81 similar in all respects to the arrangement shown in connection with the stop cock 50 in Fig. 3, the stop cock 80 serving to open and close the air passage 82 in the casing 79. After the proper amount of air has been released from the storage tank into the boat, the stop cock 80 may be closed, so as to prevent the further admission of air into the boat which would tend to increase the air pressure in the boat, above the desired point. Leading off from the opposite side of the chamber 72 is a nozzle 83 which is connected by a union 84 to the nozzle 85 of a distributer 86 containing an air chamber 87, into which projects a pipe 88, the inner end of which is arranged adjacent to one wall of the chamber 87. This pipe 88 extends outwardly through the cap or head 89 of the distributer casing, and is provided with a T 90, to which are secured oppositely extending distributing pipes 91, said pipes being connected to the T 90 by means of couplings 92. Each of the pipes 91 is perforated along the length thereof, the perforations progressively increasing in size toward the outer ends of the pipes 91, so as to insure a thorough distribution of the air under pressure to all parts of the boat occupied by the crew.

93 designates a pressure gage in communication with the distributer chamber 87.

94 designates a lubricating cup which is connected by a pipe 95 to an annular lubricating channel 96 surrounding the piston 63, for the purpose of lubricating the latter.

The air outlet or exhaust pipe, indicated at 97, consists of a rubber pipe or hose, to the outer end of which is connected a buoyant head 98 comprising oppositely arranged sections 99 and 100 bolted together in a manner similar to the buoyant head 3, above described. At its inner end, the head 98 is provided with a downwardly extending nipple 101, to which the corresponding end of the hose or pipe 97 is fastened, as shown in Fig. 2, the inner end of said hose 97 which may be of any suitable length being connected, at 102, to a deck fitting 103 passing through the deck 33 of the submarine boat. The deck fitting 103 is shown as provided with a flange 104 secured by bolts 105 to the deck. In the outer member of the buoyant head 98 is placed a valve cage 106, in which is threaded a multiple valve seat 107 containing a number of valves 108 which open outwardly and permit the vitiated air to escape, while preventing the admission of water. Each valve is provided with a valve stem 109, and a seating spring 110 held in place by a nut 111, on each valve stem. At the bottom of the valve cage 106 is placed a perforated guard 112 to prevent the nuts 111 from working off the stems of the valves.

The valve cage is provided with a flange 113, by which it is fastened to the buoyant head. Threaded on the inner end of the deck fitting 103, inside of the submarine boat, is another valve cage 114, into which is screwed a multiple valve seat 115 containing a number of valves 116 which open outwardly to allow the air to escape and which prevent the admission of water. Threaded upon the bottom of the valve cage 114 is a sealing cap 117 having a central polygonal boss 118 adapting said cap to be turned by a wrench. The cap 117 carries a water outlet nozzle 119 and is also provided with a detachable threaded plug 120, said plug being arranged in line with one of the valves 116, so that by screwing in the plug 120 to lift said valve, and opening the faucet 119 to admit air within the cap, the presence of water in the outlet pipe may be detected. If no water is found therein, then the cap 117 may be removed, so as to permit the vitiated air in the boat to pass outwardly through the pipe 97, escaping by means of the valves 108 without admitting water to the buoyant head 98 and the pipe 97.

Located on the desk of the submarine boat is a storage box 121 adapted to contain both the inlet and outlet pipes and their buoyant head, so that said parts may be released at any time to permit the buoyant heads to reach the surface of the water, or a point as near the surface, as will be permitted by the lengths of said pipes. The box 121 is provided around the margin thereof with a depression or recess 122 which receives a V-shaped rib 123 on the bottom of the box lid 124. The lid 124 is fastened to one of the sides of the box by means of hinges 125, so that said lid may swing upwardly to an open position, the lid being assisted in swinging upwardly by means of buoyant members 126 formed of some such material as cork fastened to the under side of the lid.

The lid is locked in a closed position by means of a locking bolt 127 having a lip 128 at its upper end adapted to engage a keeper 129 fastened to the bottom of the lid, as shown in Fig. 5. The deck 32 forms the bottom of the box, the sides of the box being flanged, as shown at 130, and bolted or otherwise securely fastened to the deck with a water-tight joint. The ribs 123 on the bottom of the lid embed themselves in rubber gaskets in the recesses or depressions 122, and thereby prevent the admission of water beneath the lid, when the boat is submerged.

The bolt 127 passes through a stuffing box 131 in a deck fitting 132 and downwardly through a U-shaped guide 133 provided with flanges 134 fastened to the under side of the deck by bolts 135. At its lower extremity the bolt 127 is provided with an operating handle 136, by means of which it may be given a quarter turn to move the lip 128 into and out of engagement with the keeper 129. Nuts 137 and 138 are threaded on the bolt 127 above and below the bottom bar of the guide 133, for the purpose of fastening the bolt in its locking position, and in order to release the bolt so that, in addition to its turning movement, it may be pushed upwardly to force the lid 124 open, in case it should stick.

139 represents a key or pin insertible in a slot 140 in the bolt 127, and also through a slot in the casing to prevent said bolt from turning, should the nuts 137 and 138 work loose.

In order to admit water to the box 121 and release the air therefrom, an air valve 141 is located near the top of the box, the same controlling an air outlet port 142 in the valve casing 143. A water inlet valve 144 is arranged at a lower point in the box 121, the same being mounted in the casing 145 embodying a port 146. The stem 149 of the valve 141 is connected to the upper stem 150 of the water valve 144, by means of a connecting link 151, and to the lower stem 152 of the lower valve is connected the stem 153 of an operating handle 154, the last-named stem passing through a stuffing box 155 in the deck 32, as shown in Fig. 6.

In order to loosen and tighten the nipple 12, a wrench 156 is used, the same having one end slotted to provide oppositely located jaws 157 adapted to engage flat bottom grooves 158 in the nipple 12, the wrench being held in place by means of a thumb screw 159, the inner end of which projects between the jaws 157 and prevents the accidental escape of the wrench from said nipple.

It will be understood, by reference to the drawings, that the deck fittings, referred to in the foregoing description, are all located within the storage box 121, the bottom of which is formed by the deck. This permits the inlet and outlet pipes, together with the buoyant heads carried thereby, to be located wholly within said box and beneath the water-tight cover therefor. Should the submarine boat be unable to rise to the surface, as soon as fresh air is needed by the occupants of the boat, the lid 124 of the storage box is released, and if necessary forced open by means of the bolt 127. This permits the pipes with their buoyant heads to move upwardly toward the surface of the water. If the pipes are of sufficient height, the buoyant heads arrive at the surface of the water and float thereon, thereby indicating the presence of the submarine boat at that point.

Before opening up the outlet pipe, the plug 120 is screwed in and one of the valves in line therewith lifted to ascertain whether or not there is a water leak in the pipe. If not, the sealing cap 117 is removed, which permits the vitiated air, which is under pressure in the hull of the boat, to displace the valves in the bottom and top cages and escape without admitting water. In a like manner, the inlet pipe is tested by the means described to ascertain whether or not there is a leak therein, and if not, the test cock 51 is closed and the stop cock 50 is opened, thereby allowing air to be pumped from an overhead vessel down through the inlet pipe into the compressed air tank 2.

The pressure regulator allows air to pass from the tank 2 into the vessel at a pressure sufficiently greater than ordinary atmospheric pressure to force the vitiated air out through the outlet pipe, the air pressure being regulated by the mechanism hereinabove described. Furthermore, the air delivered from the tank through the regulator into the distributing chamber is carried therefrom by the divergent distributing pipes 91 to the parts of the submarine boat. In this way, a thorough circulation of air may be maintained in the submarine boat for an indefinite period, giving ample time for the wrecking vessel to fix the necessary tackle to the submarine boat and raise the same to the surface of the water.

In order to provide for expelling the vitiated air from the submarine boat while the boat is traveling beneath the surface of the water, as in the case of bad weather when it is necessary to close the boat against the admission of water, I provide a rigid air outlet tube, shown in Fig. 8 as comprising sections 160 and 161, the said sections being provided with flanges 162, by which they are bolted together, as shown, suitable packing 163 being interposed between the flanges to form a tight joint. The lower section is provided with a deck flange 164 secured by bolts 165 to the deck, packing 166 being interposed between said flange and the deck to form a tight joint.

The upper and lower extremities of the air outlet pipe, shown in Fig. 8, are internally threaded to receive top and bottom valve cages 167 and 168, respectively, both of said valve cages being identical in construction, a description of one of said valve cages and its valve is, therefore, sufficient to disclose the construction and operation of both. Each valve cage comprises a top 169 formed with multiple valve seats 170, in which is arranged a corresponding number of upwardly opening valves 171, each of which embodies a downwardly extending stem 171', round which is a coiled expansion spring 172 interposed between the perforated bottom 173 of the valve cage and a nut 174.

At its lower end the outlet pipe is externally threaded to receive a sealing cap 175 provided with oppositely arranged handles 176 to facilitate the tightening and loosening of the same. When traveling under the surface of the water, the sealing cap 175 is removed, thereby permitting the vitiated air in the submarine boat which is under pressure to find its way out past the valves 171 in the top and bottom valve cages, hereinabove described.

Preferably the rigid air outlet pipe is located in close proximity to the dome or turret 177 of the boat, from which the usual periscope tube 178 extends upwardly, as shown in Fig. 8.

What is claimed is:

1. The combination with a submarine boat, of a compressed air tank located therein, a flexible air supply leading thereto, an air distributer to which the air is led from said tank, a pressure regulator between the tank and distributer, and a flexible air outlet pipe leading outwardly from the interior of the boat.

2. The combination with a submarine boat, of a compressed air tank located therein, a flexible air supply leading thereto, a check valve controlling said pipe, an air distributer to which the air is led from said tank, a pressure regulator between the tank and distributer, and a flexible air outlet pipe leading outwardly from the interior of the boat.

3. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, and a check valve controlling said pipe.

4. The combination with a submarine boat, of a compressed air tank located therein, a flexible air supply leading thereto, an air distributer to which the air is led from said tank, a pressure regulator between the tank and distributer, embodying a spring seated valve, and a flexible air outlet pipe leading outwardly from the interior of the boat.

5. The combination with a submarine boat, of a compressed air tank located therein, a flexible air supply leading thereto, an air distributer to which the air is led from said tank, a pressure regulator between the tank and distributer, embodying a spring seated valve, means for varying the resistance of said valve away from its seat, and a flexible air outlet pipe leading outwardly from the interior of the boat.

6. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, and a multiple valve seat and valves controlling said outlet pipe.

7. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, and valves controlling said outlet pipe at both ends.

8. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, multiple valve seats at the opposite ends of said pipes, valves therefor, and a removable sealing cap covering the valves at the boat end of said outlet pipe.

9. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, a hollow buoyant head at the free end of said outlet pipe, and a plurality of air outlet valves in said head.

10. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, multiple valve seats at the opposite ends of said pipes, valves therefor, a removable sealing cap covering the valves at the boat end of said outlet pipe, and an adjustable plug in said cap in line with one of said valves.

11. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, multiple valve seats at the opposite ends of said pipes, valves therefor, a removable sealing cap covering the valves at the boat end of said outlet pipe, an adjustable plug in said cap in line with one of said valves, and a water outlet faucet on said cap.

12. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, a check valve in said inlet pipe, and a test cock for detecting the presence of water in said inlet pipe.

13. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, said inlet pipe embodying an outer casing of rubber, an inner tube of soft metal, a deck fitting, couplings securing the casing and tube to said deck fitting, and semi-cylindrical spacers in one of said couplings to compensate for variation in the lengths of said casing and tube.

14. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, a storage box on the deck of the boat in which the flexible inlet and outlet pipes are housed when not in use, a lid for said box, and means operable within the boat for releasing said lid.

15. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, a storage box on the deck of the boat in which the flexible inlet and outlet pipes are housed when not in use, a buoyant lid for said box, and means operable within the boat for releasing said lid.

16. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, a storage box on the deck of the boat in which the flexible inlet and outlet pipes are housed when not in use, a lid for said box, and means operable within the boat for releasing said lid and forcing the same open.

17. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, a storage box on the deck of the boat in which the flexible inlet and outlet pipes are housed when not in use, a lid for said box, and valve mechanism controlled within the boat for admitting water to said storage box.

18. The combination with a submarine boat, of a compressed air tank located therein, a flexible air supply leading thereto, an air distributer to which the air is led from said tank, a pressure regulator between the tank and distributer, a flexible air outlet pipe leading outwardly from the interior of the boat, a storage box on the deck of the boat in which the flexible inlet and outlet pipes are housed when not in use, a watertight lid for said box, and means operable within the boat for releasing said lid.

19. The combination with a submarine boat, of means for supplying air to the interior of said boat under pressure, and a rigid air outlet pipe extending upwardly from the deck of the boat and having its lower end passing through the deck, and outwardly opening check valves arranged in the upper and lower ends of said outlet pipe.

20. The combination with a submarine boat, of means for supplying air to the interior of said boat under pressure, a rigid air outlet pipe extending upwardly from the deck of the boat and having its lower end passing through the deck, outwardly opening check valves arranged in the upper and lower ends of said outlet pipe, and a sealing cap removably fitted to the lower end of said air outlet pipe.

In testimony whereof I affix my signature in presence of two witnesses.

THEODORUS J. P. AANSTOOTS.

Witnesses:
  MYRON L. SEVERSON,
  SAMUEL HILFMAN.